United States Patent
Lin et al.

(10) Patent No.: US 11,076,168 B2
(45) Date of Patent: Jul. 27, 2021

(54) INTER-PREDICTION METHOD AND APPARATUS, AND STORAGE MEDIUM

(71) Applicant: Tencent Technology (Shenzhen) Company Limited, Shenzhen (CN)

(72) Inventors: Sixin Lin, Shenzhen (CN); Hongshun Zhang, Shenzhen (CN); Yaqing Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 175 days.

(21) Appl. No.: 16/597,606

(22) Filed: Oct. 9, 2019

(65) Prior Publication Data

US 2020/0045330 A1 Feb. 6, 2020

Related U.S. Application Data

(63) Continuation of application No. PCT/CN2018/103637, filed on Aug. 31, 2018.

(30) Foreign Application Priority Data

Oct. 13, 2017 (CN) .......................... 201710955097.5

(51) Int. Cl.
*H04N 19/517* (2014.01)
*H04N 19/52* (2014.01)
(Continued)

(52) U.S. Cl.
CPC ......... *H04N 19/517* (2014.11); *H04N 19/105* (2014.11); *H04N 19/139* (2014.11);
(Continued)

(58) Field of Classification Search
CPC .... H04N 19/517; H04N 19/52; H04N 19/105; H04N 19/139; H04N 19/159
See application file for complete search history.

(56) References Cited

U.S. PATENT DOCUMENTS

2013/0272409 A1 10/2013 Seregin et al.
2014/0233654 A1* 8/2014 Sato ..................... H04N 19/503
375/240.16
(Continued)

FOREIGN PATENT DOCUMENTS

| CN | 101222640 A | 7/2008 |
| CN | 103338372 A | 10/2013 |
| CN | 103813166 A | 5/2014 |

OTHER PUBLICATIONS

Yang S H, Huang K S. HEVC fast reference picture selection. Electronics Letters, 2015, 51(25): 2109-2111; available at https://ietresearch.onlinelibrary.wiley.com/doi/10.1049/el.2015.3094 (Year: 2015).*

(Continued)

*Primary Examiner* — Jeremiah C Hallenbeck-Huber
(74) *Attorney, Agent, or Firm* — Morgan, Lewis & Bockius LLP

(57) ABSTRACT

Embodiments of the present disclosure provide an inter-frame prediction method performed at a computing device. The method includes: determining at least one reference encoded block spatially adjacent to a to-be-processed prediction unit of a to-be-processed encoded block; for each preset reference frame, separately determining a corresponding AMVP of the to-be-processed prediction unit according to reference information of each reference encoded block; determining a target AMVP under the reference frames, and using a reference frame corresponding to the target AMVP as a candidate reference frame; when the candidate reference frame is different from the first reference frame, performing motion estimation on the to-be-processed prediction unit separately and determining a target reference frame from the candidate reference frame and the first reference frame
(Continued)

according to their corresponding encoding costs obtained through the motion estimation.

20 Claims, 8 Drawing Sheets

(51) Int. Cl.
  *H04N 19/105* (2014.01)
  *H04N 19/139* (2014.01)
  *H04N 19/159* (2014.01)
  *H04N 19/176* (2014.01)

(52) U.S. Cl.
  CPC ......... *H04N 19/159* (2014.11); *H04N 19/176* (2014.11); *H04N 19/52* (2014.11)

(56) References Cited

U.S. PATENT DOCUMENTS

2016/0373688 A1* 12/2016 Imajo .................. H04N 19/157
2019/0174136 A1*  6/2019 Jun ..................... H04N 19/593

OTHER PUBLICATIONS

Hong, S; Yang, D; Park, B; Kim, H; Yu, S; "Pu-type-dependent reference frame selection method for HEVC"; May 12, 2015; Springer-Verlag London; available at https://link.springer.com/content/pdf/10.1007/s11760-016-0884-7.pdf (Year: 2015).*
Tencent Technology, ISRWO, PCT/CN2018/103637, Nov. 21, 2018, 6 pgs.
Tencent Technology, IPRP, PCT/CN2018/103637, Apr. 14, 2020, 5 pgs.

* cited by examiner

INTER-PREDICTION METHOD AND APPARATUS, AND STORAGE MEDIUM

CROSS-REFERENCE TO RELATED APPLICATIONS

This application is a continuation application of PCT/CN2018/103637, entitled "INTER PREDICTION METHOD AND APPARATUS, AND STORAGE MEDIUM" filed on Aug. 31, 2018, which claims priority to Chinese Patent Application No. 201710955097.5, entitled "INTER PREDICTION METHOD AND APPARATUS, AND STORAGE MEDIUM" filed with the Patent Office of China on Oct. 13, 2017, both of which are incorporated by reference in their entirety.

FIELD OF THE TECHNOLOGY

The present disclosure relates to the field of video processing technologies, and specifically to inter prediction.

BACKGROUND OF THE DISCLOSURE

Inter prediction is a means of determining a reference frame by using other encoded blocks that have been encoded and reconstructed in the vicinity of a current encoded block, and performing prediction encoding on the current encoded block by using the reference frame through motion estimation, to eliminate time redundancy information of a video. Inter prediction is an important link of video encoding, and is especially usually applied to video encoding of hybrid encoding frameworks such as H.264/AVC, H.265/HEVC, and AVS.

An important content of performing inter prediction on the current encoded block is: selecting an optimal target reference frame from all reference frames (the optimal target reference frame is usually considered to be a reference frame with a smallest encoding cost in all the reference frames), so that prediction encoding is performed on the current encoded block by using the target reference frame through motion estimation.

Processing complexity of selecting the target reference frame in an inter-frame prediction process greatly affects efficiency of video encoding. Therefore, how to reduce the processing complexity of selecting the target reference frame, to reduce complexity of video encoding and improve efficiency of video encoding is always a problem researched by persons skilled in the art.

SUMMARY

In view of this, the embodiments of the present disclosure provide an inter-frame prediction method and apparatus, and a storage medium, to reduce processing complexity of selecting a target reference frame, reduce complexity of video encoding, and improve efficiency of video encoding.

To achieve the foregoing objective, embodiments of the present disclosure provide the following technical solutions:

According to a first aspect, an embodiment of the present disclosure provides an inter-frame prediction method, including:
  determining at least one reference encoded block spatially adjacent to a to-be-processed prediction unit of a to-be-processed encoded block, each reference encoded block having an associated preset reference frame;
  for each preset reference frame, separately determining a corresponding advanced motion vector prediction (AMVP) of the to-be-processed prediction unit under the reference frame according to reference information of a corresponding reference encoded block;
  determining a target AMVP from corresponding AMVPs of the to-be-processed prediction unit under the reference frames, and using a reference frame corresponding to the target AMVP as a candidate reference frame;
  comparing the candidate reference frame with a predetermined first reference frame;
  in accordance with that the candidate reference frame is different from the first reference frame:
    performing motion estimation on the to-be-processed prediction unit separately by using the candidate reference frame and the first reference frame, and
    determining a target reference frame of the to-be-processed prediction unit from the candidate reference frame and the first reference frame according to their corresponding encoding costs obtained through the motion estimation, the first reference frame being a reference frame most frequently used by a sub encoded block of the to-be-processed encoded block.

According to another aspect, an embodiment of the present disclosure further provides a computing device comprising one or more processors, memory coupled to the one or more processors and a plurality of programs stored in the memory that, when executed by the one or more processors, cause the computing device to perform the aforementioned inter-frame prediction method, inter-frame prediction apparatus According to another aspect, an embodiment of the present disclosure further provides a non-transitory computer readable storage medium storing a plurality of machine readable instructions in connection with a computing device having one or more processors. The plurality of machine readable instructions, when executed by the one or more processors, cause the computing device to perform the aforementioned inter-frame prediction method.

Based on the foregoing technical solutions, in the embodiments of the present disclosure, corresponding AMVPs of the to-be-processed prediction unit under the reference frames may be determined based on the reference information of the at least one reference encoded block adjacent to the space of the to-be-processed prediction unit, and the target AMVP is selected from the corresponding AMVPs; the reference frame corresponding to the target AMVP is used as the candidate reference frame and is compared with the predetermined first reference frame, to determine the target reference frame of the to-be-processed prediction unit based on a comparison result, thereby determining the target reference frame of the to-be-processed prediction unit in an inter-frame prediction process.

In the embodiments of the present disclosure, motion estimation needs to be performed on the to-be-processed prediction unit separately by using the candidate reference frame and the first reference frame only when the candidate reference frame is different from the predetermined first reference frame after the candidate reference frame is selected from all reference frames based on AMVPs, to select the target reference frame of the to-be-processed prediction unit from the candidate reference frame and the first reference frame according to their corresponding encoding costs obtained through motion estimations. Therefore, in the embodiments of the present disclosure, the number of times of motion estimation searching in the process of selecting the target reference frame of the to-be-processed prediction unit can be greatly reduced, the processing complexity of selecting the target reference frame can be reduced, so that the complexity of video encoding is reduced, and the efficiency of video encoding is improved.

BRIEF DESCRIPTION OF THE DRAWINGS

To describe the technical solutions in the embodiments of the present disclosure or in the existing technology more clearly, the following briefly introduces the accompanying drawings for describing the embodiments or the existing technology. Apparently, the accompanying drawings in the following description show merely some embodiments of the present disclosure, and a person of ordinary skill in the art may still derive other drawings from the accompanying drawings without creative efforts.

DESCRIPTION OF EMBODIMENTS

In an inter-frame prediction process, the key of reducing the processing complexity of selecting a target reference frame lies in reducing the number of times of motion estimation searching in a process of selecting the target reference frame. Because motion estimation at one time brings relatively large processing burden, how to appropriately reduce the number of times of motion estimation searching used when the target reference frame is selected in the inter-frame prediction process is particularly important. Based on this, the present disclosure provides a novel inter-frame prediction method, to reduce the number of times of motion estimation searching used when the target reference frame is selected in the inter-frame prediction process, thereby reducing the processing complexity of selecting the target reference frame.

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art according to the embodiments of the present disclosure without creative effects shall fall within the protection scope of the present disclosure.

Figure 1:
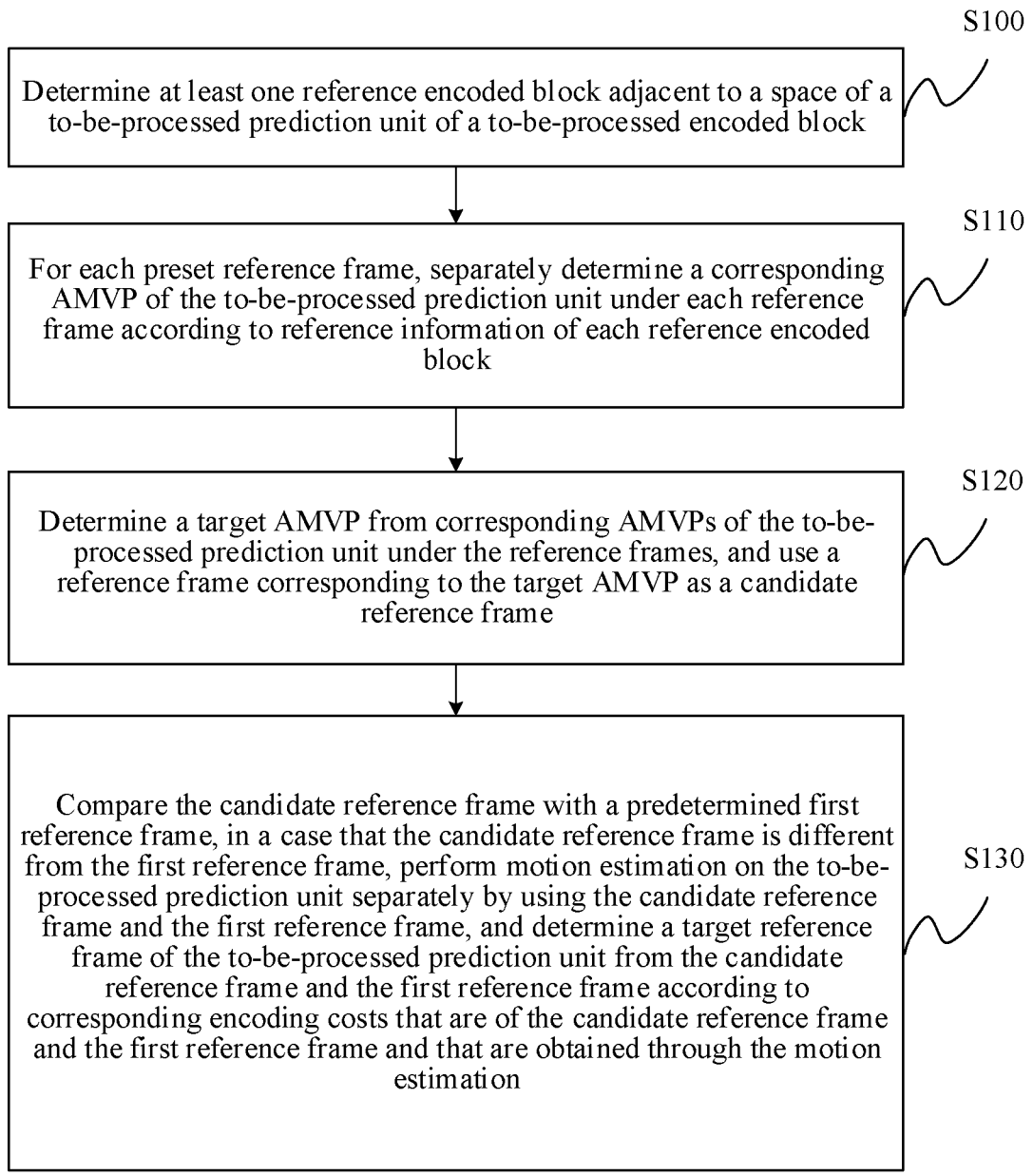
FIG. 1 is a flowchart of an inter-frame prediction method according to an embodiment of the present disclosure.

FIG. 1 is a flowchart of an inter-frame prediction method according to an embodiment of the present disclosure. The inter-frame prediction method may be applied to a video encoding device. The video encoding device may be a central processing unit (CPU) or a graphics processing unit (GPU) having a video encoding capability. Optionally, the video encoding device may be implemented by using a terminal such as a mobile phone or a notebook computer, and may also be implemented by using a server.

Referring to FIG. 1, the inter-frame prediction method provided in this embodiment of the present disclosure may include the following steps.

Step S100: Determine at least one reference encoded block adjacent to a space of a to-be-processed prediction unit of a to-be-processed encoded block.

Figure 2:
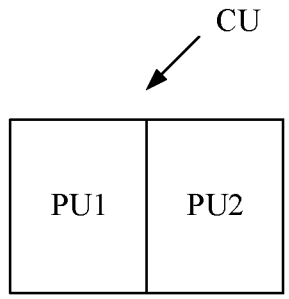
FIG. 2 is a schematic diagram of a relationship between an encoded block and a prediction unit.

The to-be-processed encoded block may be understood as a to-be-processed encoded block on which prediction encoding needs to be performed. The to-be-processed encoded block may be divided into a plurality of prediction units. As shown in FIG. 2, one encoded block (CU) may be divided into two prediction units (PU). Apparently, FIG. 2 is merely an example, and one encoded block is not limited to a case of being dividing into two prediction units.

In this embodiment of the present disclosure, each prediction unit in the to-be-processed encoded block may be processed by using the inter-frame prediction method provided in this embodiment of the present disclosure. The to-be-processed prediction unit may be considered to be a to-be-processed prediction unit that needs to perform prediction encoding in the to-be-processed encoded block.

An encoded block may be considered to be an encoded block on which prediction encoding has been performed by using the inter-frame prediction method provided in this embodiment of the present disclosure. The encoded block has selected a reference frame used for inter prediction by using the inter-frame prediction method provided in this embodiment of the present disclosure. Therefore, the reference frame selected by the encoded block and a motion vector (MV) determined based on the selected reference frame are known. In this embodiment of the present disclosure, the reference frame selected by the encoded block may be considered as the reference frame corresponding to the encoded block. The motion vector determined based on the reference frame corresponding to the encoded block may be considered as a motion vector corresponding to the encoded block.

Optionally, the selected at least one reference encoded block adjacent to the space of the to-be-processed prediction unit may be considered as: at least one encoded block that is adjacent to the space of the to-be-processed prediction unit and that is connected to an edge point of the to-be-processed prediction unit.

Figure 3:
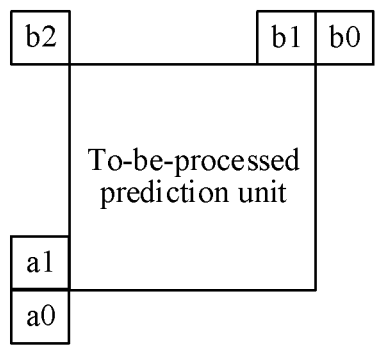
FIG. 3 is a diagram of an example of a reference encoded block.

In an example shown in FIG. 3, the at least one reference encoded block may include: an encoded block (b0) connected to an upper right edge point of the to-be-processed prediction unit, an encoded block (b1) that is connected to an upper right edge point of the to-be-processed prediction unit and that is located on an upper edge of the to-be-processed prediction unit, an encoded block (b2) connected to an upper left edge point of the to-be-processed prediction unit, an encoded block (a0) connected to a lower left edge point of the to-be-processed prediction unit, and an encoded block (a1) that is connected to the lower left edge point of the to-be-processed prediction unit and that is located on a left edge of the to-be-processed prediction unit. Apparently, the example shown in FIG. 3 is merely an exemplary description, and the specific selection of the at least one reference encoded block may be not limited to FIG. 3, and for example, only b0, b2, a0, and the like may also be selected.

Step S110: For each preset reference frame, separately determine a corresponding AMVP of the to-be-processed prediction unit under each reference frame according to reference information of each reference encoded block.

Optionally, because prediction encoding has been performed on the reference encoded block by using the inter-frame prediction method provided in this embodiment of the present disclosure, reference information such as a reference frame and a motion vector corresponding to the reference encoded block is known. For each reference frame in all preset reference frames, in this embodiment of the present disclosure, a corresponding AMVP of the to-be-processed prediction unit under each reference frame may be determined according to the reference information of each reference encoded block.

Optionally, when the corresponding AMVP of the to-be-processed prediction unit under a reference frame is determined, in this embodiment of the present disclosure, a motion vector of the to-be-processed prediction unit relative to each reference encoded block may be determined under the reference frame, to obtain a corresponding candidate motion vector of the to-be-processed prediction unit under the reference frame (under a reference frame, a motion vector of the to-be-processed prediction unit relative to each reference encoded block may be considered as a corresponding candidate motion vector of the to-be-processed prediction unit under the reference frame), to select, from corresponding candidate motion vectors of the to-be-processed prediction unit under the reference frame, a motion vector with a smallest AMVP cost as the corresponding AMVP of the to-be-processed prediction unit under the reference frame (a corresponding AMVP of the to-be-processed prediction unit under a reference frame may be considered to be a motion vector with a smallest AMVP cost in candidate motion vectors of the to-be-processed prediction unit under the reference frame).

Therefore, for the to-be-processed prediction unit, processing is performed in the foregoing manner reference frame by reference frame, to determine a corresponding AMVP of the to-be-processed prediction unit under each reference frame.

Optionally, under a reference frame, an AMVP cost of the to-be-processed prediction unit relative to a candidate motion vector may be determined in the following manner: determining a reference block that has a distance of the candidate motion vector from the reference frame and that has a same shape as the to-be-processed prediction unit, and determining an error sum between the to-be-processed prediction unit and the reference block, to obtain an AMVP cost of the to-be-processed prediction unit relative to the candidate motion vector, to perform processing in the foregoing manner candidate motion vector by candidate motion vector under a reference frame, thereby determining an AMVP cost of the to-be-processed prediction unit under a reference frame relative to each candidate motion vector.

Apparently, a manner of determining an AMVP cost is not limited thereto, and determining may also be implemented in another manner.

Optionally, one reference frame may be identified in an associated manner by using a unique reference frame index.

Step S120: Determine a target AMVP from corresponding AMVPs of the to-be-processed prediction unit under the reference frames, and use a reference frame corresponding to the target AMVP as a candidate reference frame.

Optionally, in this embodiment of the present disclosure, after the corresponding AMVP of the to-be-processed prediction unit under each reference frame is determined, an AMVP with a smallest AMVP cost in corresponding AMVPs of the to-be-processed prediction unit under the reference frames as the target AMVP, to use the reference frame corresponding to the target AMVP as the candidate reference frame for use.

Step S130: Compare the candidate reference frame with a predetermined first reference frame, in a case that the candidate reference frame is different from the first reference frame, perform motion estimation on the to-be-processed prediction unit separately by using the candidate reference frame and the first reference frame, and determine a target reference frame of the to-be-processed prediction unit from the candidate reference frame and the first reference frame according to their corresponding encoding costs obtained through the motion estimation.

Optionally, the predetermined first reference frame may be a reference frame most frequently used in a sub encoded block of the to-be-processed encoded block. The sub encode block of the to-be-processed encoded block is first precoded. One encoded block may have a plurality of encoded block modes for encoding. Each encoded block mode may correspond to a division manner of a prediction unit, and the prediction unit has independent motion information in the encoded block. Usually, one encoded block may be divided into two prediction units, and the sub encoded block is a sub area of an encoded block obtained by further dividing the encoded block in space. Usually, one encoded block may be fixedly divided into four sub encoded blocks.

Based on determining the candidate reference frame and the predetermined first reference frame, in this embodiment of the present disclosure, the candidate reference frame may be compared with the predetermined first reference frame. If they are the same, one of them may be selected as the target reference frame of the to-be-processed prediction unit. If they are different, motion estimation may be performed on the to-be-processed prediction unit separately by using the candidate reference frame and the first reference frame, and a reference frame with a smaller encoding cost is selected from the candidate reference frame and the first reference frame according to their corresponding encoding costs obtained through motion estimation as the target reference frame of the to-be-processed prediction unit.

The inter-frame prediction method provided in this embodiment of the present disclosure includes: determining at least one reference encoded block adjacent to a space of a to-be-processed prediction unit of a to-be-processed encoded block; separately determining a corresponding AMVP of the to-be-processed prediction unit under each reference frame according to reference information of each reference encoded block; determining a target AMVP from corresponding AMVPs of the to-be-processed prediction unit under the reference frames, and using a reference frame corresponding to the target AMVP as a candidate reference frame; and comparing the candidate reference frame with a predetermined first reference frame, in a case that the candidate reference frame is different from the first reference frame, performing motion estimation on the to-be-processed prediction unit separately by using the candidate reference frame and the first reference frame, and determining a target reference frame of the to-be-processed prediction unit from the candidate reference frame and the first reference frame according to their corresponding encoding costs obtained through the motion estimation.

It can be learned that, in this embodiment of the present disclosure, corresponding AMVPs of the to-be-processed prediction unit under the reference frames may be determined based on the reference information of the at least one reference encoded block adjacent to the space of the to-be-processed prediction unit, and the target AMVP is selected from the corresponding AMVPs; the reference frame corresponding to the target AMVP is used as the candidate reference frame and is compared with the predetermined first reference frame, to determine the target reference frame of the to-be-processed prediction unit based on a comparison result, thereby determining the target reference frame of the to-be-processed prediction unit in an inter-frame prediction process.

In this of the present disclosure, motion estimation needs to be performed on the to-be-processed prediction unit separately by using the candidate reference frame and the first reference frame only when the candidate reference frame is different from the predetermined first reference frame after the candidate reference frame is selected from all reference frames based on AMVPs, to select the target reference frame of the to-be-processed prediction unit from the candidate reference frame and the first reference frame according to their corresponding encoding costs obtained through motion estimations. Therefore, in this embodiment of the present disclosure, the number of times of motion estimation searching in the process of selecting the target reference frame of the to-be-processed prediction unit can be greatly reduced, the processing complexity of selecting the target reference frame can be reduced, so that the complexity of video encoding is reduced, and the efficiency of video encoding is improved.

It is assumed that all reference frames are traversed first, to estimate a motion vector prediction (MVP) of the to-be-processed prediction unit of the to-be-processed encoded block under each reference frame, and then motion estimation is performed on the to-be-processed prediction unit under each reference frame according to the corresponding MVP, to determine a motion vector (MV) and an encoding cost of the to-be-processed prediction unit under each reference frame, and select a target reference frame with a smallest encoding cost therefrom. In this way, the number of times of motion estimation searching is large, resulting in relatively high processing complexity of selecting the target reference frame. However, in this embodiment of the present disclosure, motion estimation may be performed on the to-be-processed prediction unit based on the candidate reference frame and the first reference frame, to select the target reference frame of the to-be-processed prediction unit, thereby greatly reducing the number of times of motion estimation searching.

Figure 4:
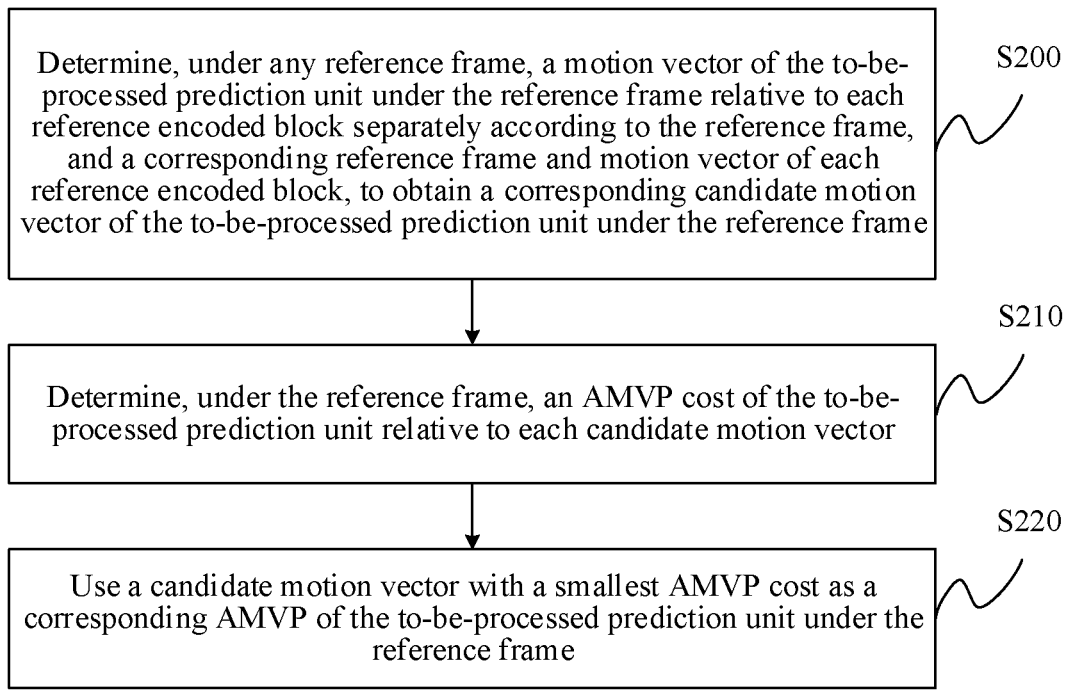
FIG. 4 is a flowchart of a method for determining a corresponding AMVP of a current prediction unit under a reference frame.

Optionally, reference information of a reference encoded block may include: a corresponding reference frame and motion vector of the reference encoded block. Correspondingly, FIG. 4 shows a method flow of determining a corresponding AMVP of the to-be-processed prediction unit under a reference frame according to an embodiment of the present disclosure. Referring to FIG. 4, the method may include the following steps.

Step S200: Determine, under the reference frame, a motion vector of the to-be-processed prediction unit under the reference frame relative to each reference encoded block separately according to the reference frame, and a corresponding reference frame and motion vector of each reference encoded block, to obtain a corresponding candidate motion vector of the to-be-processed prediction unit under the reference frame.

Optionally, the reference frame may be a reference frame that is currently traversed in all reference frames. Namely, all the reference frames may be traversed one by one, and the reference frame is a currently traversed reference frame. In this embodiment of the present disclosure, each preset reference frame may be traversed. When the current reference frame is traversed, the method shown in FIG. 4 is performed, to determine a corresponding AMVP of the to-be-processed prediction unit under the current reference frame.

Under the reference frame, for any reference encoded block of the at least one reference encoded block, in this embodiment of the present disclosure, a MV of the to-be-processed prediction unit under the reference frame relative to the reference encoded block may be determined according to the reference frame and the corresponding reference frame and the motion vector of the reference encoded block.

In an optional example, using a reference encoded block a0 as an example, assuming that a corresponding reference frame of the reference encoded block a0 is refa0, and a motion vector is MVa0, under a reference frame refldx (the reference frame refldx may be any currently traversed reference frame in all reference frames), a motion vector of the to-be-processed prediction unit under the reference frame refldx relative to the reference encoded block a0 may be: multiplying a ratio of refldx to refa0 by MVa0.

Namely, in an optional example, under the currently traversed reference frame, for a reference encoded block, in this embodiment of the present disclosure, a ratio of the reference frame to the corresponding reference frame of the reference encoded block may be multiplied by the corresponding motion vector of the reference encoded block, so that this processing is performed on each reference encoded block, to determine a motion vector of the to-be-processed prediction unit under the reference frame relative to each reference encoded block, and obtain the corresponding candidate motion vector of the to-be-processed prediction unit under the reference frame.

Step S210: Determine, under the reference frame, an AMVP cost of the to-be-processed prediction unit relative to each candidate motion vector.

Optionally, for any candidate motion vector, in this embodiment of the present disclosure, a reference block that has a distance of the candidate motion vector from any currently traversed reference frame and that has a same shape as the to-be-processed prediction unit may be determined (namely, one candidate motion vector corresponds to one reference block), and an error sum between the to-be-processed prediction unit and the reference block is calculated (optionally, the error sum may be understood as a sum of absolute values of pixel differences between the to-be-processed prediction unit and the reference block), to obtain an AMVP cost of the to-be-processed prediction unit relative to the candidate motion vector. This processing is performed on each candidate motion vector, so that an AMVP cost of the to-be-processed prediction unit relative to each candidate motion vector can be determined under any currently traversed reference frame.

Step S220: Use a candidate motion vector with a smallest AMVP cost as a corresponding AMVP of the to-be-processed prediction unit under the reference frame.

Optionally, a currently traversed reference frame in the preset reference frames is processed by using the flow shown in FIG. 4, so that after each preset reference frame is traversed, a corresponding AMVP of the to-be-processed prediction unit under each reference frame can be obtained.

After the corresponding AMVP of the to-be-processed prediction unit under each reference frame is determined, in this embodiment of the present disclosure, an AMVP with a smallest AMVP cost may be determined from corresponding AMVPs of the to-be-processed prediction unit under the reference frames as the target AMVP.

Optionally, in an optional example, in this embodiment of the present disclosure, a reference AMVP cost may be set, and an initial value of the reference AMVP cost is set to a preset maximum value, so that each time a corresponding AMVP of the to-be-processed prediction unit under a reference frame is determined, an AMVP cost of the determined AMVP is compared with the reference AMVP cost. If the AMVP cost of the AMVP is less than the reference AMVP cost, the reference AMVP cost is updated as the AMVP cost of the AMVP, until corresponding AMVPs of the to-be-processed prediction unit under all reference frames are determined.

In this way, each time a corresponding AMVP of the to-be-processed prediction unit under a reference frame is determined, the AMVP cost of the determined AMVP is compared with the reference AMVP cost, to update the reference AMVP cost, and after a corresponding AMVP of the to-be-processed prediction unit under a last reference frame is finally determined, the reference AMVP cost may be set to a corresponding smallest AMVP cost in AMVPs of the to-be-processed prediction unit under the reference frames, so that an AMVP corresponding to the finally updated reference AMVP cost may be used as the target AMVP, to determine the target AMVP with the smallest AMVP cost from corresponding AMVPs of the to-be-processed prediction unit under the reference frames.

Figure 5:
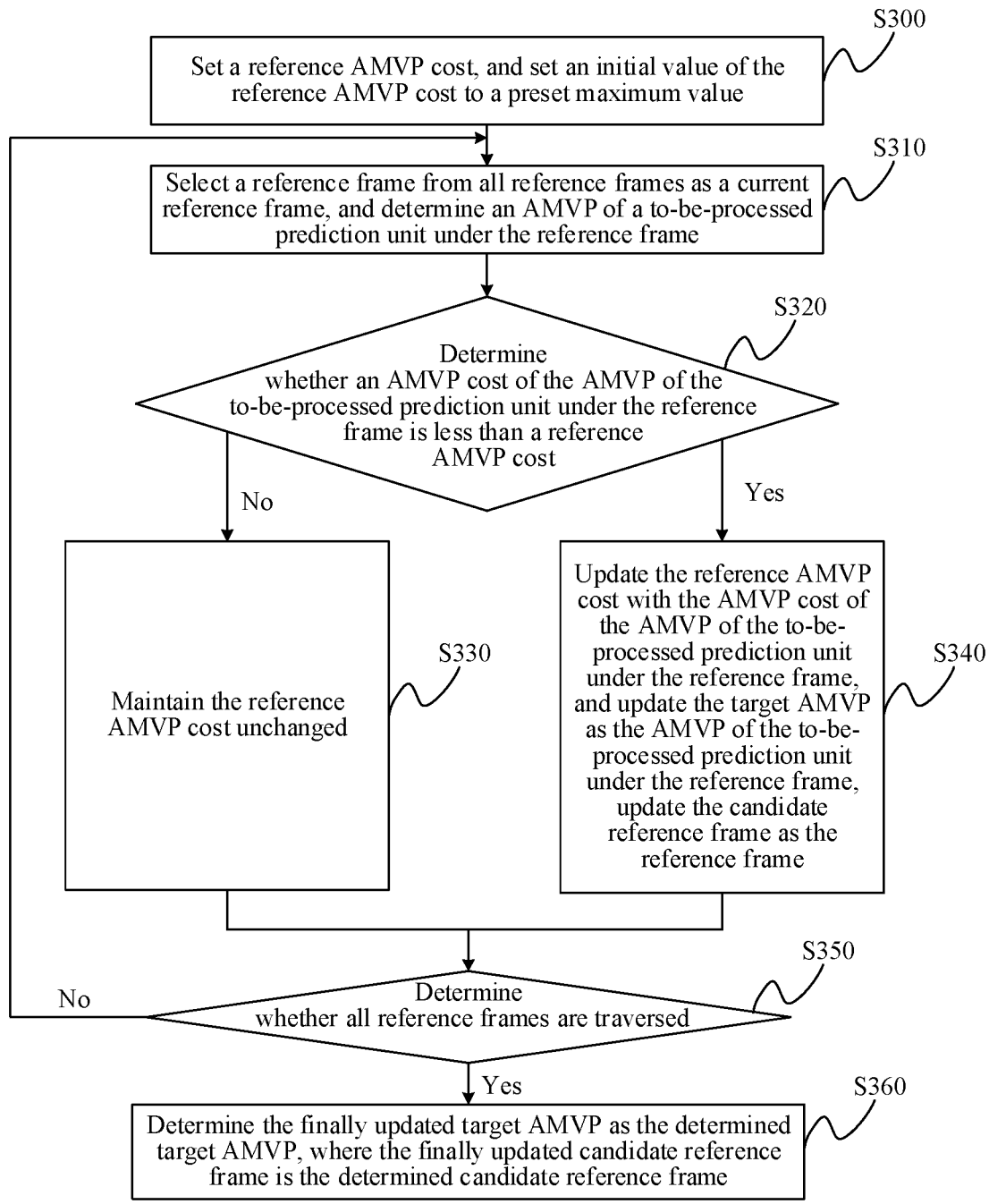
FIG. 5 is a flowchart of a method for determining a corresponding AMVP of a current prediction unit under a reference frame and determining a target AMVP.

Correspondingly, FIG. 5 is a flowchart of a method for determining a corresponding AMVP of a to-be-processed prediction unit under each reference frame and determining a target AMVP according to an embodiment of the present disclosure. Referring to FIG. 5, the flow may include the following steps.

Step S300: Set a reference AMVP cost, and set an initial value of the reference AMVP cost to a preset maximum value.

Step S310: Select a reference frame from all reference frames as a current reference frame, and determine an AMVP of a to-be-processed prediction unit under the reference frame.

Optionally, reference may be made to FIG. 4 for optional implementation of step S310.

Step S320: Determine whether an AMVP cost of the AMVP of the to-be-processed prediction unit under the reference frame is less than a reference AMVP cost, and if not, perform step S330, and if yes, perform step S340.

Step S330: Maintain the reference AMVP cost unchanged, and perform step S350.

Optionally, if the AMVP cost of the AMVP of the to-be-processed prediction unit under the reference frame is not less than the reference AMVP cost, the reference AMVP cost may be maintained unchanged.

Step S340: Update the reference AMVP cost with the AMVP cost of the AMVP of the to-be-processed prediction unit under the reference frame, and update the target AMVP as the AMVP of the to-be-processed prediction unit under the reference frame, update the candidate reference frame as the reference frame, and perform step S350.

Optionally, if the AMVP cost of the AMVP of the to-be-processed prediction unit under the reference frame is less than the reference AMVP cost, the reference AMVP cost may be updated with the AMVP cost, and the target AMVP is updated with the AMVP of the to-be-processed prediction unit under the reference frame, and the candidate reference frame is updated by with the reference frame.

Step S350: Determine whether all reference frames are traversed, and if yes, perform step S360, and if not, return to step S310.

Step S360: Determine the finally updated target AMVP as the determined target AMVP, where the finally updated candidate reference frame is the determined candidate reference frame.

It can be learned that through the circular processing reference frame by reference frame by using the method shown in FIG. 5, the finally updated reference AMVP cost may be set to a corresponding smallest AMVP cost in AMVPs of the to-be-processed prediction unit under the reference frames, so that the finally updated target AMVP (the AMVP corresponding to the finally updated reference AMVP cost) may be used as the target AMVP that needs to be determined in this embodiment of the present disclosure, and the finally updated candidate reference frame (the reference frame corresponding to the finally updated target AMVP) may be used as the candidate reference frame that needs to be determined in this embodiment of the present disclosure.

After the target AMVP is determined, in this embodiment of the present disclosure, the reference frame corresponding to the target AMVP may be used as the candidate reference frame, and is compared with the predetermined first reference frame. In this embodiment of the present disclosure, the sub encoded block of the to-be-processed encoded block needs to be pre-coded, and after the sub encoded block of the to-be-processed encoded block is encoded, in this embodiment of the present disclosure, a reference frame most frequently used in the sub encoded block of the to-be-processed encoded block may be used as the first reference frame. Optionally, reference may be made to a conventional existing manner for a manner of encoding the sub encoded block of the to-be-processed encoded block, and this is not limited in this embodiment of the present disclosure.

Figure 6:
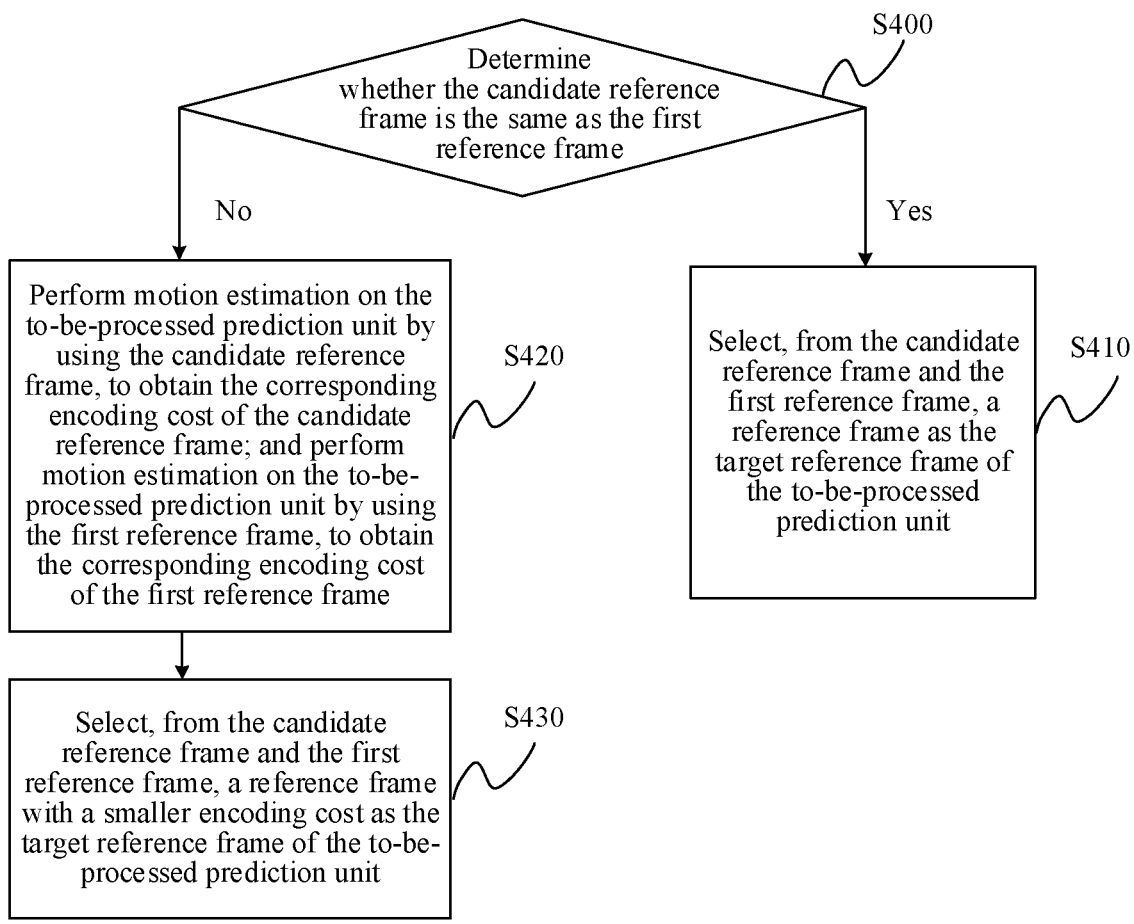
FIG. 6 is a flowchart of a method for determining a target reference frame by comparing a candidate reference frame with a first reference frame.

Optionally, after the candidate reference frame and the first reference frame are determined, FIG. 6 shows an optional process of a method for determining a target reference frame by comparing a candidate reference frame with a first reference frame. Referring to FIG. 6, the process may include the following steps.

Step S400: Determine whether the candidate reference frame is the same as the first reference frame; if yes, perform step S410, and if not, perform step S420.

Step S410: Select, from the candidate reference frame and the first reference frame, a reference frame as the target reference frame of the to-be-processed prediction unit.

Step S420: Perform motion estimation on the to-be-processed prediction unit by using the candidate reference frame, to obtain the corresponding encoding cost of the candidate reference frame; and perform motion estimation on the to-be-processed prediction unit by using the first reference frame, to obtain the corresponding encoding cost of the first reference frame.

Optionally, when motion estimation is performed on the to-be-processed prediction unit by using the candidate reference frame, in this embodiment of the present disclosure, an AMVP of the candidate reference frame may be used as a searching start point of motion estimation, to perform motion estimation on the to-be-processed prediction unit, to obtain a code rate distortion cost (an optional form of the encoding cost) corresponding to the candidate reference frame. When motion estimation is performed on the to-be-processed prediction unit by using the first reference frame, in this embodiment of the present disclosure, the AMVP of the first reference frame may be used as a searching start point of motion estimation, to perform motion estimation on the to-be-processed prediction unit, to obtain a code rate distortion cost corresponding to the first reference frame.

Step S430: Select, from the candidate reference frame and the first reference frame, a reference frame with a smaller encoding cost as the target reference frame of the to-be-processed prediction unit.

Optionally, further, after the target reference frame of the to-be-processed prediction unit is determined, in this embodiment of the present disclosure, motion estimation may be performed on the to-be-processed prediction unit by using the target reference frame, a residual block corresponding to the to-be-processed prediction unit is determined, conversion and quantization are performed on the residual block, and then reordering and entropy encoding are performed on a converted and quantized residual block, to obtain a video encoding result of the to-be-processed prediction unit. Video encoding results of prediction units of the to-be-processed encoded block are combined, so that an encoding result of the to-be-processed encoded block can be obtained by means of inter prediction encoding.

Figure 7:
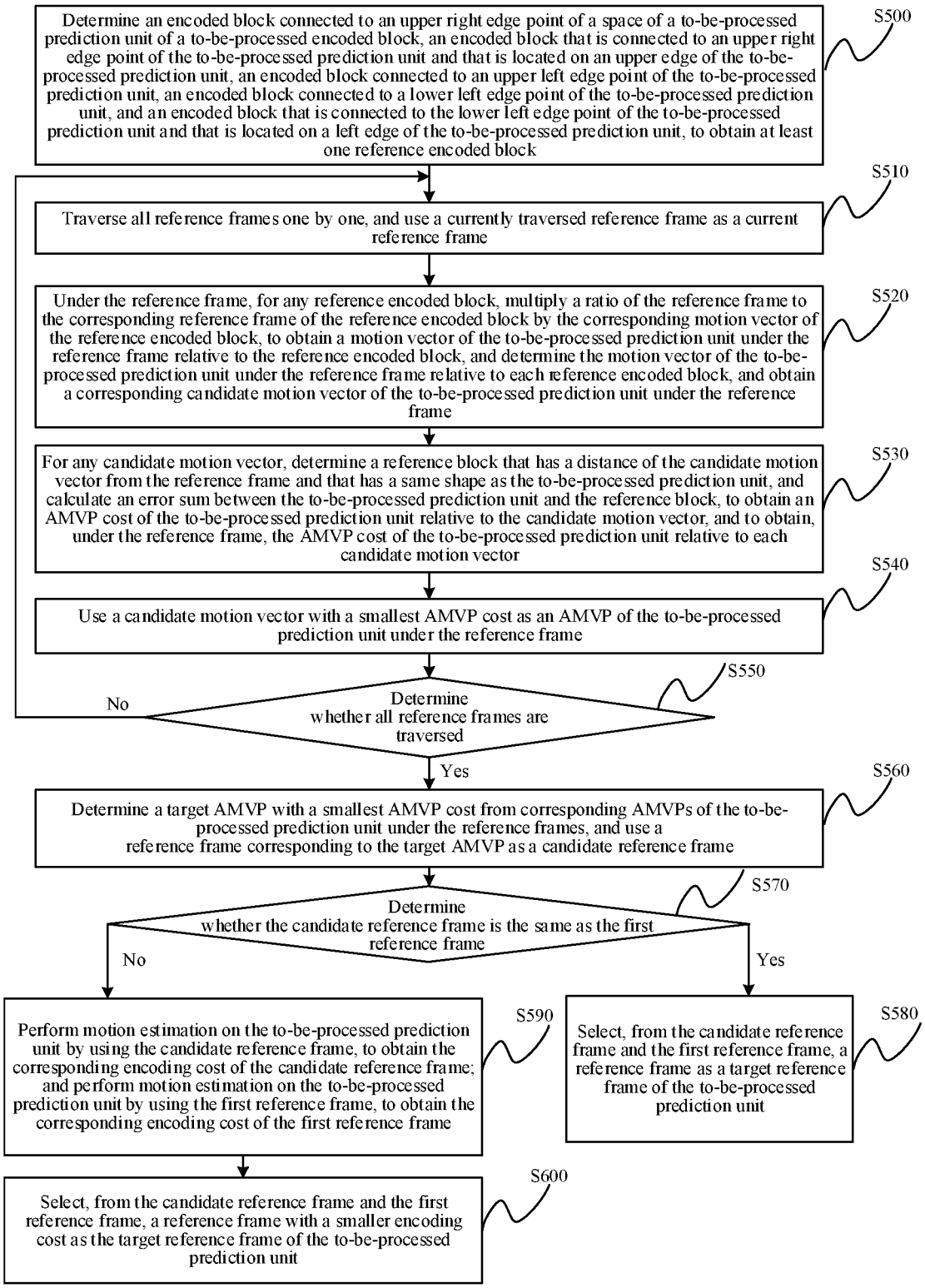
FIG. 7 is another flowchart of an inter-frame prediction method according to an embodiment of the present disclosure.

Optionally, FIG. 7 shows another flow of an inter-frame prediction method according to an embodiment of the present disclosure. Referring to FIG. 7, the flow may include the following steps.

Step S500: Determine an encoded block connected to an upper right edge point of a space of a to-be-processed prediction unit of a to-be-processed encoded block, an encoded block that is connected to an upper right edge point of the to-be-processed prediction unit and that is located on an upper edge of the to-be-processed prediction unit, an encoded block connected to an upper left edge point of the to-be-processed prediction unit, an encoded block connected to a lower left edge point of the to-be-processed prediction unit, and an encoded block that is connected to the lower left edge point of the to-be-processed prediction unit and that is located on a left edge of the to-be-processed prediction unit, to obtain at least one reference encoded block.

Step S510: Traverse all reference frames one by one, and use a currently traversed reference frame as a current reference frame.

Step S520: Under the reference frame, for any reference encoded block, multiply a ratio of the reference frame to the corresponding reference frame of the reference encoded block by the corresponding motion vector of the reference encoded block, to obtain a motion vector of the to-be-processed prediction unit under the reference frame relative to the reference encoded block, and determine the motion vector of the to-be-processed prediction unit under the reference frame relative to each reference encoded block, and obtain a corresponding candidate motion vector of the to-be-processed prediction unit under the reference frame.

Step S530: For any candidate motion vector, determine a reference block that has a distance of the candidate motion vector from the reference frame and that has a same shape as the to-be-processed prediction unit, and calculate an error sum between the to-be-processed prediction unit and the reference block, to obtain an AMVP cost of the to-be-processed prediction unit relative to the candidate motion vector, and to obtain, under the reference frame, the AMVP cost of the to-be-processed prediction unit relative to each candidate motion vector.

Step S540: Use a candidate motion vector with a smallest AMVP cost as an AMVP of the to-be-processed prediction unit under the reference frame.

Step S550: Determine whether all reference frames are traversed; if not, return to step S510, and if yes, obtain a corresponding AMVP of the to-be-processed prediction unit under each reference frame, and perform step S560.

Step S560: Determine a target AMVP with a smallest AMVP cost from corresponding AMVPs of the to-be-processed prediction unit under the reference frames, and use a reference frame corresponding to the target AMVP as a candidate reference frame.

Step S570: Determine whether the candidate reference frame is the same as the first reference frame; if yes, perform step S580, and if not, perform step S590.

Step S580: Select, from the candidate reference frame and the first reference frame, a reference frame as a target reference frame of the to-be-processed prediction unit.

Step S590: Perform motion estimation on the to-be-processed prediction unit by using the candidate reference frame, to obtain the corresponding encoding cost of the candidate reference frame; and perform motion estimation on the to-be-processed prediction unit by using the first reference frame, to obtain the corresponding encoding cost of the first reference frame.

Step S600: Select, from the candidate reference frame and the first reference frame, a reference frame with a smaller encoding cost as the target reference frame of the to-be-processed prediction unit.

An application example of the inter-frame prediction method provided in this embodiment of the present disclosure may be application to a video encoding device. When the video encoding device performs video encoding on a video image, any to-be-processed encoded block of the video image is encoded by means of inter prediction encoding, and in this process, the target reference frame of the to-be-processed prediction unit of the to-be-processed encoded block is determined by using the inter-frame prediction method provided in this embodiment of the present disclosure.

Figure 8:
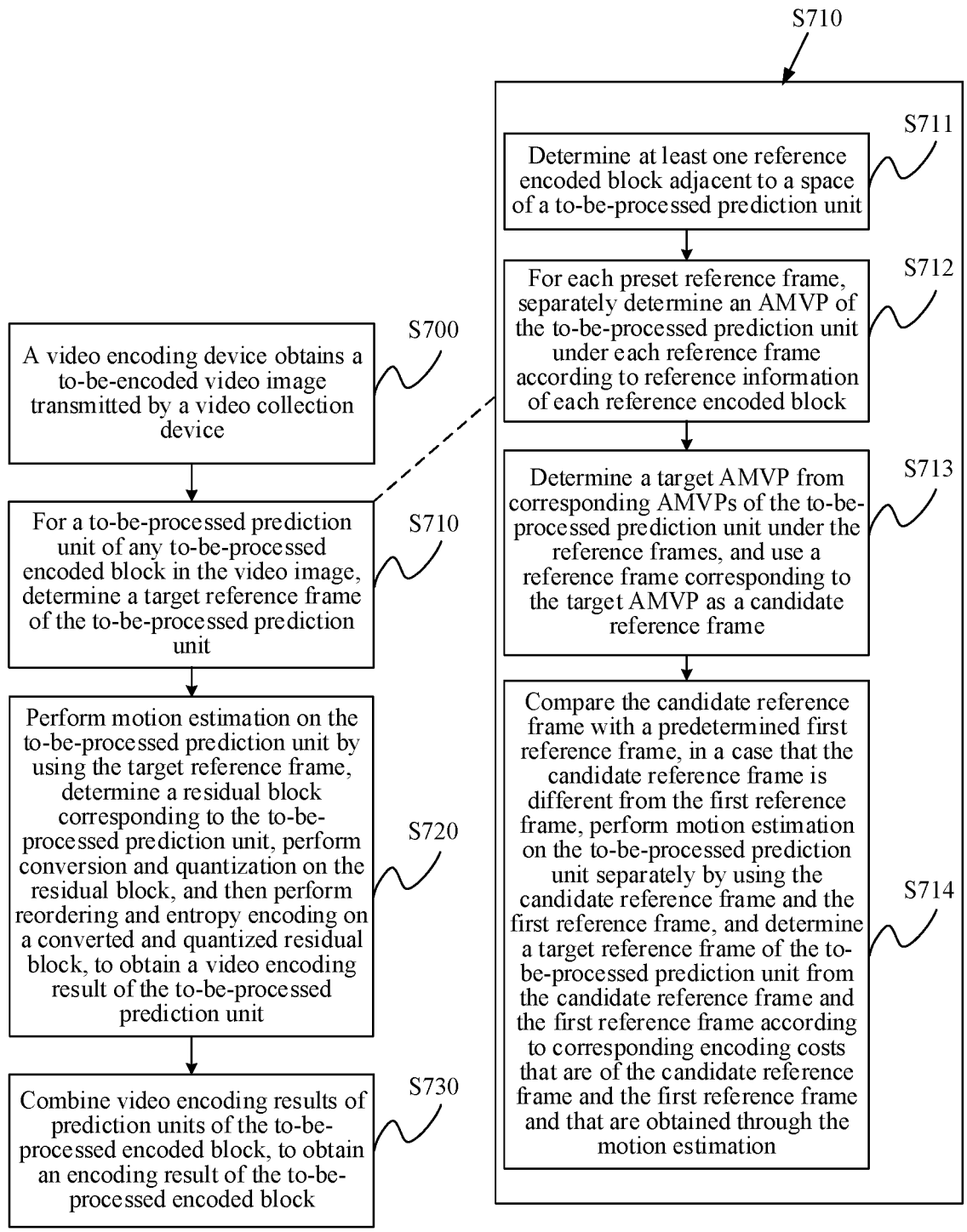
FIG. 8 is a flowchart of an example of a video encoding application according to an embodiment of the present disclosure.

Optionally, in an application example, a video encoding process of the inter-frame prediction method provided in this embodiment of the present disclosure may be shown in FIG. 8, and includes the following steps.

Step S700: A video encoding device obtains a to-be-encoded video image transmitted by a video collection device.

Optionally, after collecting the video image, the video collection device may transmit the collected video image to the video encoding device, and the video encoding device performs video encoding by means of inter prediction encoding.

Optionally, the video collection device may be a terminal device having an image collection apparatus such as a camera. For example, the video collection device may be a video collection terminal or the like in a video live broadcast scenario. Apparently, a source from which the video encoding device obtains the to-be-encoded video frame is not limited to the video collection device. For example, the video encoding device may also perform re-encoding or the like on the stored video image.

Optionally, the video encoding device may be implemented by a terminal such as a mobile phone or a notebook computer, or may be implemented by a server disposed on a network side.

Step S710: For a to-be-processed prediction unit of any to-be-processed encoded block in the video image, determine a target reference frame of the to-be-processed prediction unit.

After obtaining the to-be-encoded video image, the video encoding device may encode the video image in units of encoded blocks. For example, after obtaining the video image, the video encoding device may perform image division on the video image, to divide the image into a plurality of encoded blocks.

For the to-be-processed prediction unit of any to-be-processed encoded block in the video image, the target reference frame of the to-be-processed prediction unit may be determined by using the foregoing inter-frame prediction method provided in this embodiment of the present disclosure.

Optionally, a process of determining the target reference frame of the to-be-processed prediction unit may be refining step S710 in FIG. 8, including:

Step S711: Determine at least one reference encoded block adjacent to a space of a to-be-processed prediction unit.

Step S712: For each preset reference frame, separately determine an AMVP of the to-be-processed prediction unit under each reference frame according to reference information of each reference encoded block.

Step S713: Determine a target AMVP from corresponding AMVPs of the to-be-processed prediction unit under the reference frames, and use a reference frame corresponding to the target AMVP as a candidate reference frame.

Step S714: Compare the candidate reference frame with a predetermined first reference frame, in a case that the candidate reference frame is different from the first reference frame, perform motion estimation on the to-be-processed prediction unit separately by using the candidate reference frame and the first reference frame, and determine a target reference frame of the to-be-processed prediction unit from the candidate reference frame and the first reference frame according to their corresponding encoding costs obtained through the motion estimation.

Optionally, reference may be made to descriptions of corresponding parts in the foregoing text for refined descriptions of step S711 to step S714.

Step S720: Perform motion estimation on the to-be-processed prediction unit by using the target reference frame, determine a residual block corresponding to the to-be-processed prediction unit, perform conversion and quantization on the residual block, and then perform reordering and entropy encoding on a converted and quantized residual block, to obtain a video encoding result of the to-be-processed prediction unit.

Step S730: Combine video encoding results of prediction units of the to-be-processed encoded block, to obtain an encoding result of the to-be-processed encoded block.

According to the inter-frame prediction method provided in this embodiment of the present disclosure, in the process of determining the target reference frame of the to-be-processed prediction unit, the number of times of motion estimation searching can be reduced, the processing complexity of selecting the target reference frame can be reduced, so that the complexity of video encoding is reduced, and the efficiency of video encoding is improved.

An inter-frame prediction apparatus provided in an embodiment of the present disclosure is described below. The inter-frame prediction apparatus described below may be considered as program modules disposed by the video encoding device for implementing the inter-frame prediction method provided in the embodiments of the present disclosure. Content of the inter-frame prediction apparatus described below may correspondingly refer to content of the inter-frame prediction method described above.

Figure 9:
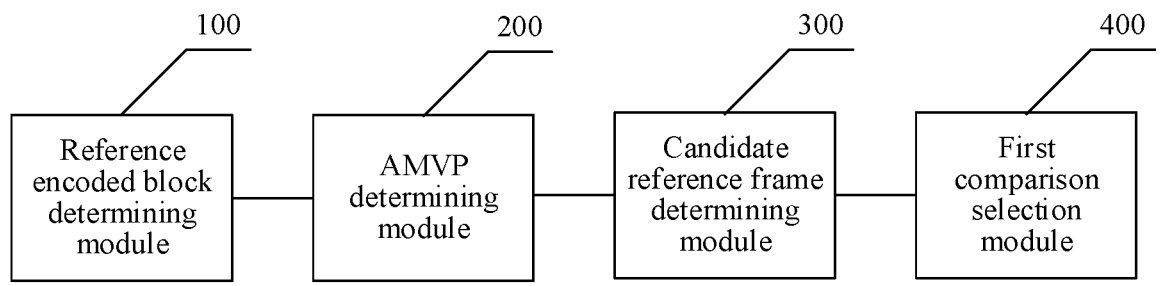
FIG. 9 is a structural block diagram of an inter-frame prediction apparatus according to an embodiment of the present disclosure.

FIG. 9 is a structural block diagram of an inter-frame prediction apparatus according to an embodiment of the present disclosure. The inter-frame prediction apparatus may be applied to a video encoding device. Referring to FIG. 9, the inter-frame prediction apparatus may include:

a reference encoded block determining module 100, configured to determine at least one reference encoded block adjacent to a space of a to-be-processed prediction unit of a to-be-processed encoded block;

an AMVP determining module 200, configured to: for each preset reference frame, separately determine a corresponding AMVP of the to-be-processed prediction unit under each reference frame according to reference information of each reference encoded block;

a candidate reference frame determining module 300, configured to: determine a target AMVP from corresponding AMVPs of the to-be-processed prediction unit under the reference frames, and use a reference frame corresponding to the target AMVP as a candidate reference frame; and a first comparison selection module 400, configured to: compare the candidate reference frame with a predetermined first reference frame, in a case that the candidate reference frame is different from the first reference frame, perform motion estimation on the to-be-processed prediction unit separately by using the candidate reference frame and the first reference frame, and determine a target reference frame of the to-be-processed prediction unit from the candidate reference frame and the first reference frame according to their corresponding encoding costs obtained through the motion estimation, the first reference frame being a reference frame most frequently used by a sub encoded block of the to-be-processed encoded block.

Optionally, that the AMVP determining module 200 is configured to separately determine a corresponding AMVP of the to-be-processed prediction unit under each reference frame according to reference information of each reference encoded block specifically includes:

traversing each preset reference frame, and in a case that any reference frame is traversed, determining, under the reference frame, a motion vector of the to-be-processed prediction unit under the reference frame relative to each reference encoded block separately according to the reference frame, and a corresponding reference frame and motion vector of each reference encoded block, to obtain a corresponding candidate motion vector of the to-be-processed prediction unit under the reference frame; and determining, under the reference frame, an AMVP cost of the to-be-processed prediction unit relative to each candidate motion vector, and using a candidate motion vector with a smallest AMVP cost as a corresponding AMVP of the to-be-processed prediction unit under the reference frame, to obtain a corresponding AMVP of the to-be-processed prediction unit under each reference frame after each preset reference frame is traversed.

Optionally, that the AMVP determining module 200 is configured to determine, under the reference frame, a motion vector of the to-be-processed prediction unit under the reference frame relative to each reference encoded block separately according to the reference frame, and a corresponding reference frame and motion vector of each reference encoded block specifically includes:

under the reference frame, for any reference encoded block, multiplying a ratio of the reference frame to the corresponding reference frame of the reference encoded block by the corresponding motion vector of the reference encoded block, to obtain a motion vector of the to-be-processed prediction unit under the reference frame relative to the reference encoded block, and determine the motion vector of the to-be-processed prediction unit under the reference frame relative to each reference encoded block.

Optionally, that the AMVP determining module 200 is configured to determine, under the reference frame, an AMVP cost of the to-be-processed prediction unit relative to each candidate motion vector specifically includes:

under the reference frame, for any candidate motion vector, determining a reference block that has a distance of the candidate motion vector from the reference frame and that has a same shape as the to-be-processed prediction unit, and calculating an error sum between the to-be-processed prediction unit and the reference block, to obtain an AMVP cost of the to-be-processed prediction unit relative to the candidate motion vector, and determine the AMVP cost of the to-be-processed prediction unit relative to each candidate motion vector.

Optionally, that the candidate reference frame determining module 300 is configured to determine a target AMVP from corresponding AMVPs of the to-be-processed prediction unit under the reference frames specifically includes:

selecting, from the corresponding AMVPs of the to-be-processed prediction unit under the reference frames, an AMVP with a smallest AMVP cost as the target AMVP.

Optionally, that the candidate reference frame determining module 300 is configured to select, from the corresponding AMVPs of the to-be-processed prediction unit under the reference frames, an AMVP with a smallest AMVP cost as the target AMV specifically includes:

each time a corresponding AMVP of the to-be-processed prediction unit under a reference frame is determined, comparing an AMVP cost of the determined AMVP with a reference AMVP cost, and in a case that the AMVP cost of the determined AMVP is less than the reference AMVP cost, updating the reference AMVP cost as the AMVP cost of the determined AMVP, until corresponding AMVPs of the to-be-processed prediction unit under all reference frames are determined; and using a corresponding AMVP of a finally updated reference AMVP cost as the target AMVP.

Optionally, that the first comparison selection module 400 is configured to: perform motion estimation on the to-be-processed prediction unit separately by using the candidate reference frame and the first reference frame, and determine a target reference frame of the to-be-processed prediction unit from the candidate reference frame and the first reference frame according to their corresponding encoding costs obtained through the motion estimation specifically includes:

performing motion estimation on the to-be-processed prediction unit by using the candidate reference frame, to obtain the corresponding encoding cost of the candidate reference frame; and performing motion estimation on the to-be-processed prediction unit by using the first reference frame, to obtain the corresponding encoding cost of the first reference frame; and selecting, from the candidate reference frame and the first reference frame, a reference frame with a smaller encoding cost as the target reference frame of the to-be-processed prediction unit.

Figure 10:
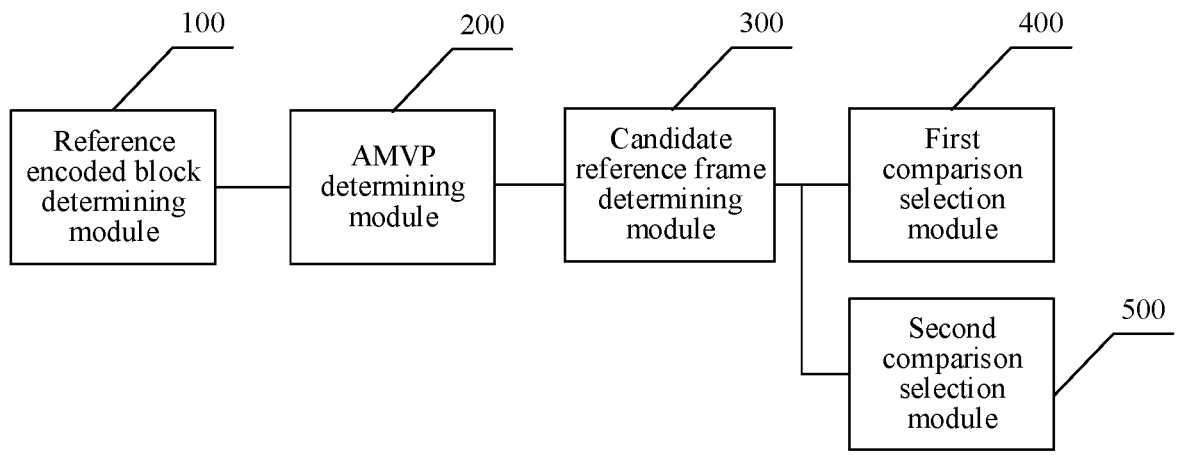
FIG. 10 is another structural block diagram of an inter-frame prediction apparatus according to an embodiment of the present disclosure.

Optionally, FIG. 10 is another structural block diagram of an inter-frame prediction apparatus according to an embodiment of the present disclosure. As shown in FIG. 9 and FIG. 10, the apparatus may further include:

a second comparison selection module 500, configured to: in a case that the candidate reference frame is the same as the first reference frame, select, from the candidate reference frame and the first reference frame, a reference frame as the target reference frame of the to-be-processed prediction unit.

Specifically, that the reference encoded block determining module 100 is configured to determine at least one reference encoded block adjacent to a space of a to-be-processed prediction unit of a to-be-processed encoded block specifically includes:

determining at least one encoded block that is adjacent to the space of the to-be-processed prediction unit and that is connected to an edge point of the to-be-processed prediction unit.

Optionally, in an optional example, the at least one reference encoded block may include: an encoded block connected to an upper right edge point of the to-be-processed prediction unit, an encoded block that is connected to an upper right edge point of the to-be-processed prediction unit and that is located on an upper edge of the to-be-processed prediction unit, an encoded block connected to an upper left edge point of the to-be-processed prediction unit, an encoded block connected to a lower left edge point of the to-be-processed prediction unit, and an encoded block that is connected to the lower left edge point of the to-be-processed prediction unit and that is located on a left edge of the to-be-processed prediction unit.

Figure 11:
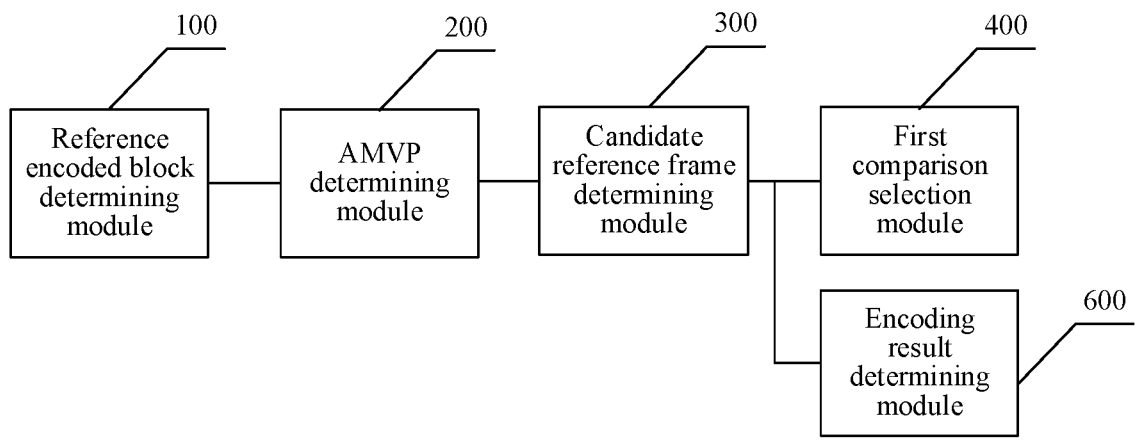
FIG. 11 is still another structural block diagram of an inter-frame prediction apparatus according to an embodiment of the present disclosure.

Optionally, FIG. 11 is still another structural block diagram of an inter-frame prediction apparatus according to an embodiment of the present disclosure. As shown in FIG. 9 and FIG. 11, the apparatus may further include:

an encoding result determining module 600, configured to: perform motion estimation on the to-be-processed prediction unit by using the target reference frame, determine a residual block corresponding to the to-be-processed prediction unit, perform conversion and quantization on the residual block, and then perform reordering and entropy encoding on a converted and quantized residual block, to obtain a video encoding result of the to-be-processed prediction unit.

The inter-frame prediction apparatus provided in this embodiment of the present disclosure can reduce processing complexity of selecting a target reference frame, reduce complexity of video encoding, and improve efficiency of video encoding.

Figure 12:
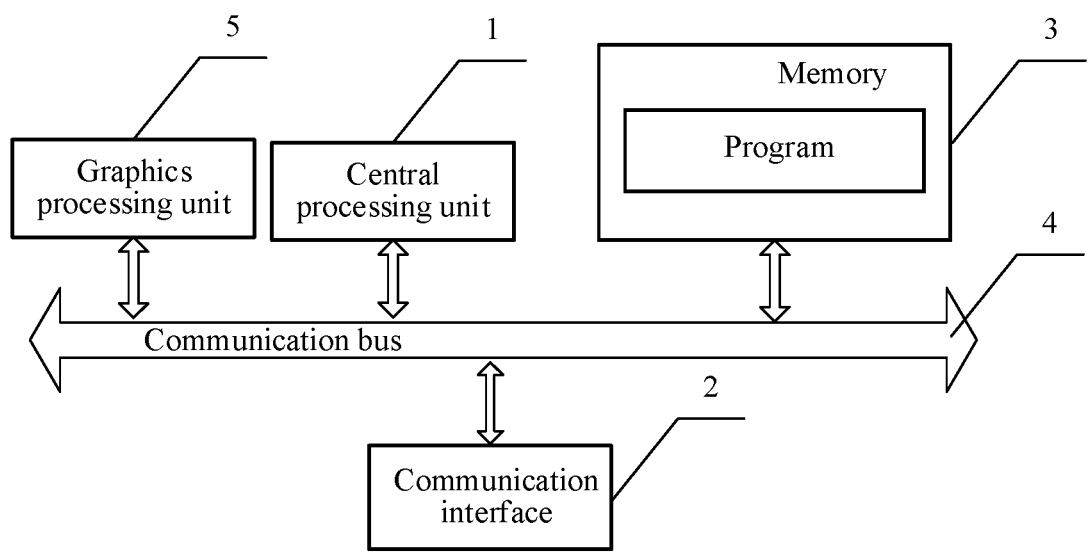
FIG. 12 is a structural block diagram of hardware of a video encoding device.

The inter-frame prediction apparatus described above may be loaded in a video encoding device in a form of a program module. Optionally, FIG. 12 is a structural block diagram of hardware of a video encoding device. Referring to FIG. 12, the video encoding device may include: at least one central processing unit 1, at least one communication interface 2, at least one memory 3, at least one communication bus 4, and at least one graphics processing unit 5.

In this embodiment of the present disclosure, there is at least one processor 1, at least one communication interface 2, at least one memory 3, at least one communication bus 4, and at least one graphics processing unit 5, and the processor 1, the communication interface 2, and the memory 3 complete mutual communication via the communication bus 4.

The memory stores a program adapted to be executed by the central processing unit or the graphics processing unit, and the program is configured to:

determine at least one reference encoded block adjacent to a space of a to-be-processed prediction unit of a to-be-processed encoded block;

for each preset reference frame, separately determine an AMVP of the to-be-processed prediction unit under each reference frame according to reference information of each reference encoded block;

determine a target AMVP from corresponding AMVPs of the to-be-processed prediction unit under the reference frames, and use a reference frame corresponding to the target AMVP as a candidate reference frame; and compare the candidate reference frame with a predetermined first reference frame, in a case that the candidate reference frame is different from the first reference frame, perform motion estimation on the to-be-processed prediction unit separately by using the candidate reference frame and the first reference frame, and determine a target reference frame of the to-be-processed prediction unit from the candidate reference frame and the first reference frame according to their corresponding encoding costs obtained through the motion estimation, the first reference frame being a reference frame most frequently used by a sub encoded block of the to-be-processed encoded block.

Optionally, reference may be made to descriptions of corresponding parts in the foregoing text for the refining function and expanding function of the program.

Further, an embodiment of the present disclosure further provides a storage medium, the storing medium storing a program adapted to be executed by a central processing unit or a graphics processing unit, and the program being configured to:

determine at least one reference encoded block adjacent to a space of a to-be-processed prediction unit of a to-be-processed encoded block;

for each preset reference frame, separately determine an AMVP of the to-be-processed prediction unit under each reference frame according to reference information of each reference encoded block;

determine a target AMVP from corresponding AMVPs of the to-be-processed prediction unit under the reference frames, and use a reference frame corresponding to the target AMVP as a candidate reference frame; and compare the candidate reference frame with a predetermined first reference frame, in a case that the candidate reference frame is different from the first reference frame, perform motion estimation on the to-be-processed prediction unit separately by using the candidate reference frame and the first reference frame, and determine a target reference frame of the to-be-processed prediction unit from the candidate reference frame and the first reference frame according to their corresponding encoding costs obtained through the motion estimation, the first reference frame being a reference frame most frequently used by a sub encoded block of the to-be-processed encoded block.

In addition, an embodiment of the present disclosure further provides a storage medium, configured to store program code, and the program code is configured to perform the inter-frame prediction method provided in the foregoing embodiment.

An embodiment of the present disclosure further provides a computer program product including an instruction, when being run on a computer, the computer program product enabling the computer to perform the inter-frame prediction method provided in the foregoing embodiment.

Optionally, reference may be made to descriptions of corresponding parts in the foregoing text for the refining function and expanding function of the program.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above descriptions of the disclosed embodiments make a person skilled in the art implement or use the present disclosure. Various modifications to these embodiments are obvious to a person skilled in the art, and the general principles defined in this specification may be implemented in other embodiments without departing from the core spirit or scope of the present disclosure. Therefore, the present disclosure is not limited to these embodiments illustrated in this specification, but needs to conform to the broadest scope consistent with the principles and novel features disclosed in this specification.

What is claimed is:

1. An inter-frame prediction method performed at a computing device having one or more processors and memory storing a plurality of programs to be executed by the one or more processors, the method comprising:

determining at least one reference encoded block spatially adjacent to a to-be-processed prediction unit of a to-be-processed encoded block, each reference encoded block having an associated preset reference frame;

for each preset reference frame, separately determining a corresponding advanced motion vector prediction (AMVP) of the to-be-processed prediction unit under the reference frame according to reference information of a corresponding reference encoded block;

determining a target AMVP from corresponding AMVPs of the to-be-processed prediction unit under the reference frames, and using a reference frame corresponding to the target AMVP as a candidate reference frame;

comparing the candidate reference frame with a predetermined first reference frame;

in accordance with that the candidate reference frame is different from the first reference frame:
performing motion estimation on the to-be-processed prediction unit separately by using the candidate reference frame and the first reference frame; and
determining a target reference frame of the to-be-processed prediction unit from the candidate reference frame and the first reference frame according to their corresponding encoding costs obtained through the motion estimation, the first reference frame being a reference frame most frequently used by a sub encoded block of the to-be-processed encoded block.

2. The inter-frame prediction method according to claim 1, wherein the separately determining an AMVP of the to-be-processed prediction unit under the reference frame according to reference information of a corresponding reference encoded block comprises:

determining, under the reference frame, a motion vector of the to-be-processed prediction unit under the reference frame relative to the corresponding reference encoded block separately according to the reference frame, and a corresponding reference frame and motion vector of the corresponding reference encoded block, to obtain a corresponding candidate motion vector of the to-be-processed prediction unit under the reference frame;

determining, under the reference frame, an AMVP cost of the to-be-processed prediction unit relative to each candidate motion vector; and using a candidate motion vector with a smallest AMVP cost as a corresponding AMVP of the to-be-processed prediction unit under the reference frame, to obtain a corresponding AMVP of the to-be-processed prediction unit under the reference frame.

3. The inter-frame prediction method according to claim 2, wherein the determining, under the reference frame, a motion vector of the to-be-processed prediction unit under the reference frame relative to the corresponding reference encoded block separately according to the reference frame, and a corresponding reference frame and motion vector of the corresponding reference encoded block comprises:

under the reference frame, for any reference encoded block, multiplying a ratio of the reference frame to the corresponding reference frame of the reference encoded block by the corresponding motion vector of the reference encoded block, to obtain a motion vector of the to-be-processed prediction unit under the reference frame relative to the reference encoded block, and determine the motion vector of the to-be-processed prediction unit under the reference frame relative to each reference encoded block.

4. The inter-frame prediction method according to claim 2, wherein the determining, under the reference frame, an AMVP cost of the to-be-processed prediction unit relative to each candidate motion vector comprises:

under the reference frame, determining a reference block that has a distance of the candidate motion vector from the reference frame and that has a same shape as the to-be-processed prediction unit, and calculating an error sum between the to-be-processed prediction unit and the reference block, to obtain an AMVP cost of the to-be-processed prediction unit relative to the candidate motion vector, and determine the AMVP cost of the to-be-processed prediction unit relative to each candidate motion vector.

5. The inter-frame prediction method according to claim 1, wherein the determining a target AMVP from corresponding AMVPs of the to-be-processed prediction unit under the reference frames comprises:

selecting, from the corresponding AMVPs of the to-be-processed prediction unit under the reference frames, an AMVP with a smallest AMVP cost as the target AMVP.

6. The inter-frame prediction method according to claim 5, wherein the selecting, from the corresponding AMVPs of the to-be-processed prediction unit under the reference frames, an AMVP with a smallest AMVP cost as the target AMVP comprises:

after a corresponding AMVP of the to-be-processed prediction unit under a reference frame is determined,
comparing an AMVP cost of the determined AMVP with a reference AMVP cost;
in accordance with that the AMVP cost of the determined AMVP is less than the reference AMVP cost, updating the reference AMVP cost as the AMVP cost of the determined AMVP, until corresponding AMVPs of the to-be-processed prediction unit under all reference frames are determined; and
using a corresponding AMVP of a finally updated reference AMVP cost as the target AMVP.

7. The inter-frame prediction method according to claim 1, wherein the performing motion estimation on the to-be-processed prediction unit separately by using the candidate reference frame and the first reference frame, and determining a target reference frame of the to-be-processed prediction unit from the candidate reference frame and the first reference frame according to their corresponding encoding costs comprises:

performing motion estimation on the to-be-processed prediction unit by using the candidate reference frame, to obtain the corresponding encoding cost of the candidate reference frame; and performing motion estimation on the to-be-processed prediction unit by using the first reference frame, to obtain the corresponding encoding cost of the first reference frame; and selecting, from the candidate reference frame and the first reference frame, a reference frame with a smaller encoding cost as the target reference frame of the to-be-processed prediction unit.

8. The inter-frame prediction method according to claim 1, further comprising:

in a case that the candidate reference frame is the same as the first reference frame, selecting, from the candidate reference frame and the first reference frame, a reference frame as the target reference frame of the to-be-processed prediction unit.

9. The inter-frame prediction method according to claim 1, wherein the determining at least one reference encoded block adjacent to a space of a to-be-processed prediction unit of a to-be-processed encoded block comprises:

determining at least one encoded block that is adjacent to the space of the to-be-processed prediction unit and that is connected to an edge point of the to-be-processed prediction unit.

10. The inter-frame prediction method according to claim 1, further comprising:
performing motion estimation on the to-be-processed prediction unit by using the target reference frame, determining a residual block corresponding to the to-be-processed prediction unit, performing conversion and quantization on the residual block, and then performing reordering and entropy encoding on a converted and quantized residual block, to obtain a video encoding result of the to-be-processed prediction unit.

11. A computing device comprising one or more processors, memory coupled to the one or more processors and a plurality of programs stored in the memory that, when executed by the one or more processors, cause the computing device to perform a plurality of operations comprising:
determining at least one reference encoded block spatially adjacent to a to-be-processed prediction unit of a to-be-processed encoded block, each reference encoded block having an associated preset reference frame;
for each preset reference frame, separately determining a corresponding advanced motion vector prediction (AMVP) of the to-be-processed prediction unit under the reference frame according to reference information of a corresponding reference encoded block;
determining a target AMVP from corresponding AMVPs of the to-be-processed prediction unit under the reference frames, and using a reference frame corresponding to the target AMVP as a candidate reference frame;
comparing the candidate reference frame with a predetermined first reference frame;
in accordance with that the candidate reference frame is different from the first reference frame:
performing motion estimation on the to-be-processed prediction unit separately by using the candidate reference frame and the first reference frame; and
determining a target reference frame of the to-be-processed prediction unit from the candidate reference frame and the first reference frame according to their corresponding encoding costs obtained through the motion estimation, the first reference frame being a reference frame most frequently used by a sub encoded block of the to-be-processed encoded block.

12. The computing device according to claim 11, wherein the separately determining an AMVP of the to-be-processed prediction unit under the reference frame according to reference information of a corresponding reference encoded block comprises:
determining, under the reference frame, a motion vector of the to-be-processed prediction unit under the reference frame relative to the corresponding reference encoded block separately according to the reference frame, and a corresponding reference frame and motion vector of the corresponding reference encoded block, to obtain a corresponding candidate motion vector of the to-be-processed prediction unit under the reference frame;
determining, under the reference frame, an AMVP cost of the to-be-processed prediction unit relative to each candidate motion vector; and
using a candidate motion vector with a smallest AMVP cost as a corresponding AMVP of the to-be-processed prediction unit under the reference frame, to obtain a corresponding AMVP of the to-be-processed prediction unit under the reference frame.

13. The computing device according to claim 11, wherein the determining a target AMVP from corresponding AMVPs of the to-be-processed prediction unit under the reference frames comprises:
selecting, from the corresponding AMVPs of the to-be-processed prediction unit under the reference frames, an AMVP with a smallest AMVP cost as the target AMVP.

14. The computing device according to claim 11, wherein the performing motion estimation on the to-be-processed prediction unit separately by using the candidate reference frame and the first reference frame, and determining a target reference frame of the to-be-processed prediction unit from the candidate reference frame and the first reference frame according to their corresponding encoding costs comprises:
performing motion estimation on the to-be-processed prediction unit by using the candidate reference frame, to obtain the corresponding encoding cost of the candidate reference frame; and performing motion estimation on the to-be-processed prediction unit by using the first reference frame, to obtain the corresponding encoding cost of the first reference frame; and
selecting, from the candidate reference frame and the first reference frame, a reference frame with a smaller encoding cost as the target reference frame of the to-be-processed prediction unit.

15. The computing device according to claim 11, wherein the plurality of operations further comprise:
in a case that the candidate reference frame is the same as the first reference frame, selecting, from the candidate reference frame and the first reference frame, a reference frame as the target reference frame of the to-be-processed prediction unit.

16. The computing device according to claim 11, wherein the determining at least one reference encoded block adjacent to a space of a to-be-processed prediction unit of a to-be-processed encoded block comprises:
determining at least one encoded block that is adjacent to the space of the to-be-processed prediction unit and that is connected to an edge point of the to-be-processed prediction unit.

17. The computing device according to claim 11, wherein the plurality of further comprise:
performing motion estimation on the to-be-processed prediction unit by using the target reference frame, determining a residual block corresponding to the to-be-processed prediction unit, performing conversion and quantization on the residual block, and then performing reordering and entropy encoding on a converted and quantized residual block, to obtain a video encoding result of the to-be-processed prediction unit.

18. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
determining at least one reference encoded block spatially adjacent to a to-be-processed prediction unit of a to-be-processed encoded block, each reference encoded block having an associated preset reference frame;
for each preset reference frame, separately determining a corresponding advanced motion vector prediction (AMVP) of the to-be-processed prediction unit under the reference frame according to reference information of a corresponding reference encoded block;

determining a target AMVP from corresponding AMVPs of the to-be-processed prediction unit under the reference frames, and using a reference frame corresponding to the target AMVP as a candidate reference frame;

comparing the candidate reference frame with a predetermined first reference frame;

in accordance with that the candidate reference frame is different from the first reference frame:
    performing motion estimation on the to-be-processed prediction unit separately by using the candidate reference frame and the first reference frame; and
    determining a target reference frame of the to-be-processed prediction unit from the candidate reference frame and the first reference frame according to their corresponding encoding costs obtained through the motion estimation, the first reference frame being a reference frame most frequently used by a sub encoded block of the to-be-processed encoded block.

19. The non-transitory computer readable storage medium according to claim 18, wherein the separately determining an AMVP of the to-be-processed prediction unit under the reference frame according to reference information of a corresponding reference encoded block comprises:
    determining, under the reference frame, a motion vector of the to-be-processed prediction unit under the reference frame relative to the corresponding reference encoded block separately according to the reference frame, and a corresponding reference frame and motion vector of the corresponding reference encoded block, to obtain a corresponding candidate motion vector of the to-be-processed prediction unit under the reference frame;
    determining, under the reference frame, an AMVP cost of the to-be-processed prediction unit relative to each candidate motion vector; and
    using a candidate motion vector with a smallest AMVP cost as a corresponding AMVP of the to-be-processed prediction unit under the reference frame, to obtain a corresponding AMVP of the to-be-processed prediction unit under the reference frame.

20. The non-transitory computer readable storage medium according to claim 18, wherein the performing motion estimation on the to-be-processed prediction unit separately by using the candidate reference frame and the first reference frame, and determining a target reference frame of the to-be-processed prediction unit from the candidate reference frame and the first reference frame according to their corresponding encoding costs comprises:
    performing motion estimation on the to-be-processed prediction unit by using the candidate reference frame, to obtain the corresponding encoding cost of the candidate reference frame; and performing motion estimation on the to-be-processed prediction unit by using the first reference frame, to obtain the corresponding encoding cost of the first reference frame; and
    selecting, from the candidate reference frame and the first reference frame, a reference frame with a smaller encoding cost as the target reference frame of the to-be-processed prediction unit.

* * * * *